Nov. 30, 1965     S. A. AGNEW ETAL     3,221,134
SHIELDING GAS BOXES FOR VERTICAL WELDING
Filed July 19, 1963
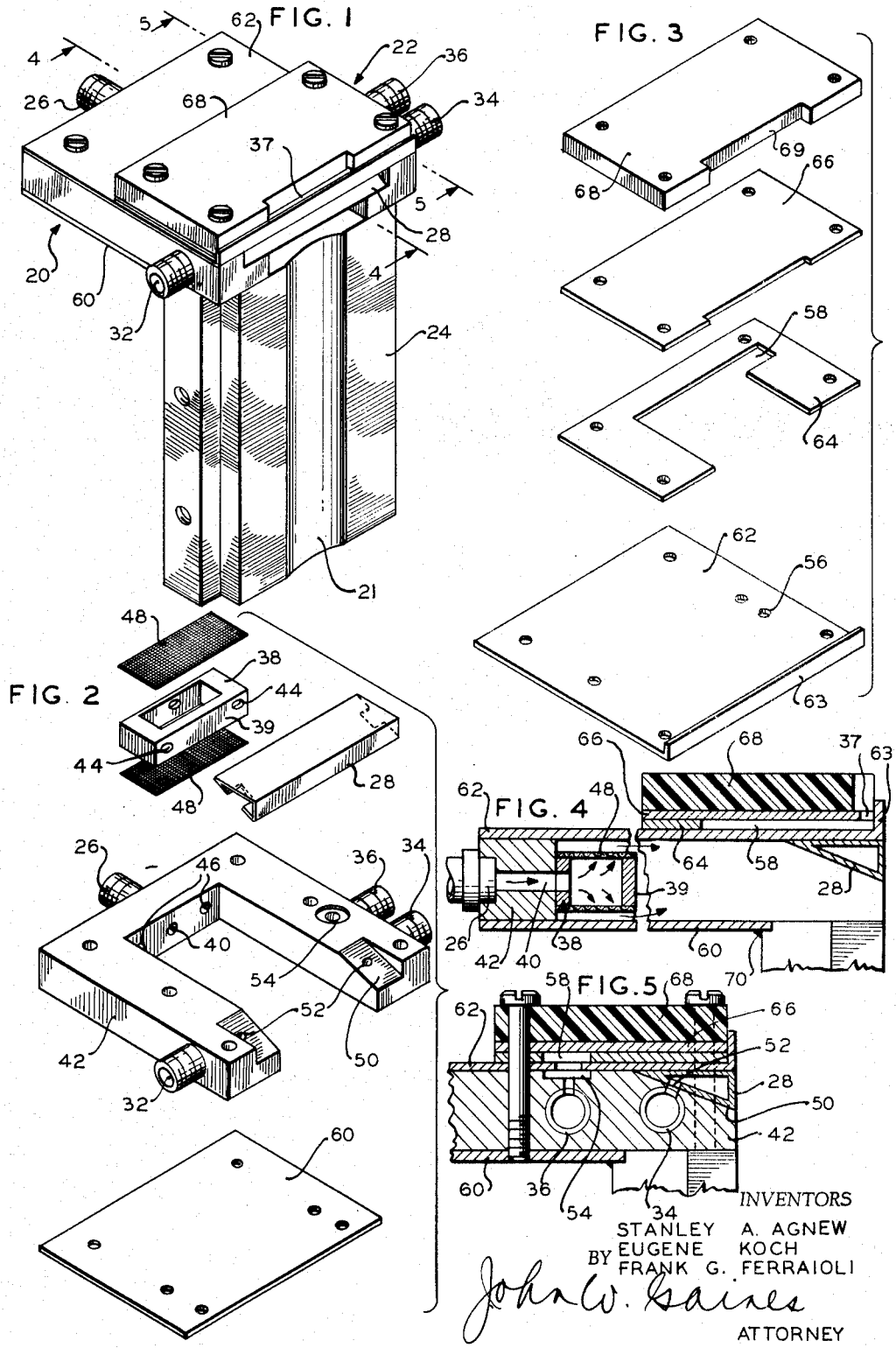
INVENTORS
STANLEY A. AGNEW
EUGENE KOCH
FRANK G. FERRAIOLI
BY John W. Gaines
ATTORNEY

United States Patent Office 3,221,134
Patented Nov. 30, 1965

3,221,134
SHIELDING GAS BOXES FOR VERTICAL WELDING
Stanley A. Agnew, New Providence, Eugene Koch, Maplewood, and Frank G. Ferraioli, Berkeley Heights, N.J., assignors to Air Reduction Company, Incorporated, New York, N.Y., a corporation of New York
Filed July 19, 1963, Ser. No. 296,348
11 Claims. (Cl. 219—126)

This invention relates to welding apparatus for generally vertical welding and more particularly to gas boxes comprising means for directing shielding gas to the vicinity of the weld together with an auxiliary gas box for maintaining an additonal gas curtain when necessary for protecting the weld from wind or drafts such as might be detrimental to the welding operation.

An object of the invention is to direct a stream of shielding gas into a cavity into which weld metal is being cast, such as a cavity formed by two opposed welding dams and two plates to be welded.

Another object is to prevent any material spattered from the arc from fouling or obstructing the feed passages by which the shielding gas is brought to the vicinity of the arc.

A further object is to produce substantially laminar flow of the shielding gas.

A further object is to screen the entire region of the arc and the surrounding mass of shielding gas from disturbance due to wind or drafts.

A further object is to protect the parts of the gas box from deterioration due to heat and spatter from the arc.

A further object is to provide these and other advantages in a form of apparatus suitable for use in continuous vertical welding.

A feature of the invention is an internally cooled deflecting lip for directing shielding gas from a gas box at a proper angle of entry into the space between the welding dams in a substantially vertical welding set-up.

Another feature is a diffusion chamber having perforate walls, interposed in the path of the shielding gas, for promoting laminar flow of the gas and so arranged that the perforate walls are protected by a spatter shield from any material spattered by the arc.

A further feature is a hollow construction of a deflecting lip through which coolant may be circulated to cool the lip while it is deflecting a stream of gas in the presence of heat and spatter from the arc.

A further feature is a simple and inexpensive means for providing a baffle for protecting an arc or other work region from disturbance due to wind or drafts. This is accomplished by means of a curtain or wall or rapidly moving air or other gas properly disposed to provide such protection.

Other features, objects and advantages will appear from the following more detailed description of an illustrative embodiment of the invention, which will now be given in conjunction with the accompanying drawings.

In the drawing,

FIG. 1 is a perspective view of main and auxiliary gas boxes, in accordance with the invention, showing how they are positioned with refererce to a welding dam for use in vertical welding;

FIG. 2 is an exploded view of the main gas box of FIG. 1, which performs the function of supplying shielding gas to the welding arc and vicinity;

FIG. 3 is an exploded view of the auxiliary gas box of FIG. 1, which provides a curtain or wall of air or gas to protect an adjacent space from disturbance by wind or drafts;

FIG. 4 is a vertical cross section on a larger scale than FIGS. 1–3, through the gas box of FIG. 1, taken along the line 4—4 as shown in FIG. 1; to show the path followed by shielding gas; and FIG. 5 is a vertical cross section on the scale of FIG. 4, through a portion of the gas box, taken along the line 5—5 as shown in FIG. 1, to show passages for coolant in the deflecting lip of the main gas box and to show the inlet for air or gas into the auxiliary gas box of FIG. 3.

Referring to FIG. 1, a main gas box 20 is shown in combination with an auxiliary gas box 22. The combination is shown mounted at the top of a welding dam 24 for use in confining and molding a vertical weld. The welding dam is more completely disclosed in a copending application of Eugene Koch and Frank G. Ferraioli, Serial No. 296,347. Shielding gas is supplied to the main gas box by way of a gas inlet 26. A deflecting lip 28 is provided at the end of the main gas box opposite from the inlet 26 to deflect shielding gas through an opening in the box and downward into the space defined in part by a shallow depression 21 in the face of the dam 24. Coolant inlet and outlet connections are provided at 32 and 34 which open into the interior of the lip 28 which latter is of hollow construction as shown in FIGS. 2, 4 and 5. Air or gas to form a curtain is introduced into the auxiliary gas box 22 by way of an inlet connection 36 and emerges vertically upward through a slot 37.

The inner arrangement of the main gas box 20, which supplies shielding gas to the vicinity of the arc, is shown in exploded view in FIG. 2 and in cross section in FIGS. 4 and 5. The shielding gas inlet connection 26 opens into a diffusion chamber with perforate walls, shown as a screen box 38, through a hole 40 in the main frame portion 42 of the main gas box 20. The screen box 38 is fastened to the frame 42 as by screws (not shown) passing through clearance holes 44 in the screen box into threaded engagement in holes 46 in the frame. Screens 48, which may be of brass and of 150 mesh, for example, are fastened over top and bottom openings in the screen box 38 in any suitable manner, such as by soldering, and the screen box is of such size as to leave a restricted passage-way for gas above and below the screen box, as shown in cross section in FIG. 4.

The hollow deflecting lip 28 is of triangular cross section, as shown in FIGS. 2, 4 and 5. It is mounted on slanting ledges 50 at the front of frame 42 as shown in FIG. 2 and coolant is admitted to the interior of the lip 28 through holes 52 in the frame that are connected to the inlet and outlet connections 32, 34. The lip is preferably thin-walled.

Gas entering the inlet 36 passes through a short inner passage in the frame 42 and emerges through an opening 54 which registers with a hole 56 (FIG. 3) and opens into a cut-out portion 58 (FIG. 3) of the auxiliary gas box 22.

The main gas box 20 is enclosed by a lower cover plate 60 and an upper cover plate 62 (FIG. 3), the latter cover plate serving also as a bottom plate for the auxiliary gas box 22 shown in exploded view in FIG. 3. The plate 60 is soldered to the frame 42.

The inner arrangement of the auxiliary gas box 22 is shown in exploded form in FIG. 3. Mounted above the bottom cover plate 62 are metal plates 64 and 66 and an electrically insulating top plate 68 for protecting the gas box from neighboring conductors of different potentials, particularly conductors at welding potential. The intermediate plate 64 is formed with the opening or cutout portion 58 which in conjunction with the bottom plate 62 and the plate 66 forms a passage for gas for providing the desired gas curtain, the plates 62, 64 and 66 being soldered together. A cross-sectional view of this passage is shown in FIG. 4 and a portion of the opening 58 is also shown in FIG. 5 in relation to the hole 54 and the gas inlet 36. A notched portion of the front edge of the plate 66 in conjunction with an upturned lip portion 63 of plate 62 forms the outlet slot 38 for the curtain gas. The insulating plate 68 is cut away as shown at 69 to avoid covering the slot 37.

The junction of the bottom of the main gas box and the top of the welding dam is preferably sealed to prevent aspiration of air. For this purpose, there is shown in FIG. 4 a seal 70 such as a solder fillet.

The insulating top plate 68 may be omitted wherever there is no danger of electrical contact between the top of the gas box and neighboring conductors of different electrical potential.

The operation of the gas box 20 in supplying shielding gas to the vicinity of the arc is illustrated to FIGS. 4 and 5. The shielding gas enters the gas box through the inlet connection 26 and is conveyed within the frame member 42 by way of the hole 40 into the screen box 38. The gas is then forced through the screens 48 both upwardly and downwardly into the narrow spaces above and below the screen box and bounded by the bottom plate 60 and the top plate 62. The gas is constrained by the screens and the restricted passageways above and below the screen box into substantially laminar flow, without material turbulence. The gas flows through the central cavity of the frame 42, still in substantially laminar flow, and strikes the lip 28 which deflects the gas stream downwardly toward the vicinity of the arc. The flow of coolant within the hollow interior of the lip 28 substantially prevents overheating and deterioration of the lip that would otherwise result from heat and spatter received from the arc cavity. The solid front face 39 of the screen box 38 faces toward the outlet end of the gas box whence may come material spattered by the arc. The face 39 is in position to intercept such spattered material and to prevent such material from striking or fouling the screens 48, thus forming a protective wall for the protection of the perforate portion of the screen box.

The operation of the auxiliary gas box 22 in producing the desired gas curtain is also illustrated in FIGS. 4 and 5. Air or other gas enters the auxiliary gas box by way of the inlet connection 36 (FIG. 5), the frame 42 and hole 54, into the space 58 between the plates 62 and 66. This gas is then forced substantially vertically upward through the slot 37 (FIG. 4) between the lip 63 and the plate 66. The emerging gas forms a rapidly moving curtain or barrier which protects the operating region, including the arc and the surrounding mass of shielding gas, from wind or drafts.

In an embodiment that has been built and successfully operated, we have used a 150 mesh screen in the diffusion chamber, and gas mixtures comprising 12 to 27 percent carbon dioxide, remainder argon, at flow rates of 15 to 40 cubic feet per hour. For the curtain wall we have found that air or argon serve equally well.

While illustrative forms of apparatus and methods in accordance with the invention have been described and shown herein, it will be understood that numerous changes may be made without departing from the general principles and scope of the invention.

What is claimed is:

1. In a gas box for supplying gas to a welding arc or the like, a diffusion chamber having two mutually opposed perforate walls interposed in the path of the gas through said box to promote laminar flow of said gas emerging from said diffusion chamber, said box having two opposed confining walls each separated by a relatively narrow spacing from one of said perforate walls of the said diffusion chamber, thereby forming restricted outlet passages for the gas, said restricted passages serving to protect said perforate walls from spatter from the arc.

2. In a gas box for supplying shielding gas to a welding arc or the like, a diffusion chamber having a perforate wall, said diffusion chamber being connected at the inlet of said gas box, said gas box having a confining wall spaced at a relatively small distance from the said perforate wall of said diffusion chamber, thereby protecting said perforate wall from spatter from the arc.

3. In a gas box for supplying gas to a welding arc or the like, a diffusion box having a solid protective wall portion facing in the direction of the outlet of said gas box whence may come material spattered by the arc, said diffusion box being connected in the path of the gas between the inlet and the outlet of the gas box, and said diffusion box having a perforate portion facing in a direction substantially at right angles to the direction toward the outlet of the gas box, whereby the said perforate portion of the diffusion box is protected from deterioration or clogging due to material spattered by the arc.

4. In a gas box for supplying gas to a welding arc or the like, a diffusion box having a solid protective wall portion facing in the direction of the outlet of said gas box whence may come material spattered by the arc, said diffusion box having a perforate portion protected from exposure to material spattered by the arc, said diffusion box having an inlet for said gas and said perforate portion forming an outlet for said gas.

5. In a gas box for supplying shielding gas to a welding arc or the like, in combination, a diffusion chamber enclosed in said gas box, said diffusion box having a solid wall exposed in the direction of the outlet of the gas box to protect said diffusion chamber from material spattered by the arc and entering the gas box through the outlet thereof, said diffusion chamber having a perforate portion in a position protected by said solid wall from material spattered by the arc, said gas box and said diffusion chamber being so arranged as to form a restricted passageway for gas between a wall of said gas box and the perforate portion of the diffusion chamber, and means at the outlet of the gas box to deflect the gas in the direction toward the arc.

6. In a fixture for providing a curtain wall of gas, in combination, a bottom plate having an upwardly turned lip, an intermediate plate mounted upon said bottom plate and having a cutout portion thereof enclosing a space open to a portion of said lip on said bottom plate, said bottom plate having an inlet opening therein which opens into the said cut-out portion of said intermediate plate, and a top plate having a narrow notch in an edge thereof that forms together with the said upturning lip of the bottom plate a narrow outlet slot, whereby gas forced into said fixture through the said inlet opening in the bottom plate emerges in a thin sheet from said narrow outlet slot.

7. In a fixture for providing a curtain wall of gas, in combination, a first plate having a lip projecting substantially at right angles thereto from one edge thereof, a second plate mounted upon said first plate on the side of the projection therefrom and having a cut-out portion enclosing a space open to a portion of the said lip on said first plate, said first plate having an inlet opening therein which opens into the said cut-out portion of said second plate, and a third plate having a narrow notch in an edge thereof, said third plate being mounted upon said second plate with said notched edge against the said lip of said first plate, said lip and said notched third plate cooperating to form a narrow outlet slot opening out from said cut-out portion of said second plate, so that gas forced into said fixture through the said inlet in the first plate emerges in a thin sheet from said outlet slot.

8. Apparatus for directing a stream of shielding gas into a welding cavity into which weld metal is being cast, comprising, in combination, a gas box for producing a stream of gas directed at a material angle to a main axis of the welding cavity, the outlet of said gas box being positioned adjacent to the entrance to said welding cavity and so placed that the stream of gas is in a line which intersects the said axis of the welding cavit, and deflecting means located at the outlet of the gas box for deflecting the gas stream into a direction substantially coincident with the said main axis of the welding cavity.

9. Apparatus according to claim 8, in which said deflecting means is in the form of a deflecting lip member.

10. Apparatus according to claim 8, in which said deflecting means is in the form of a hollow member, and means to pass a coolant through the hollow portion of said deflecting means.

11. In apparatus for generally vertical welding, in combination, a welding dam, the working surface of which welding dam defines in part a welding cavity into which weld metal is being cast, a gas box mounted upon said welding dam, said gas box having a gas inlet and a gas outlet and serving to form and direct a gas stream into a substantially horizontal direction, said gas outlet opening into said cavity, and deflecting means located at said gas outlet for deflecting the said gas stream as a whole through a material angle into said welding cavity.

References Cited by the Examiner

UNITED STATES PATENTS

| | | | |
|---|---|---|---|
| 2,395,723 | 2/1946 | Chmielewski | 219—137 |
| 2,550,495 | 4/1951 | Pilia | 219—127 |
| 2,590,084 | 3/1952 | Bernard | 219—75 |
| 2,788,430 | 4/1957 | Oakley | 219—74 |
| 2,900,487 | 8/1959 | Danhier | 219—126 |
| 3,053,967 | 9/1962 | Gorman et al. | 219—74 |
| 3,125,666 | 3/1964 | Gorman et al. | 219—74 |

RICHARD M. WOOD, *Primary Examiner.*